UNITED STATES PATENT OFFICE.

FRANK E. HATCH, OF WINNIPEG, CANADA.

HOOF MIXTURE.

No. 811,718.  Specification of Letters Patent.  Patented Feb. 6, 1906.

Application filed June 19, 1905. Serial No. 266,049.

*To all whom it may concern:*

Be it known that I, FRANK E. HATCH, gentleman, of the city of Winnipeg, in the county of Selkirk, Province of Manitoba, Dominion of Canada, have invented certain new and useful Improvements in Hoof Mixture, of which the following is a specification.

My invention relates to improvements in hoof mixture; and the objects of my invention are to provide a compound which when regularly applied to animals' hoofs will clean and soften them and generally keep them in a healthy condition.

The composition consists of the following ingredients combined in the proportions stated—viz., water, one quart; saltpeter, one ounce; sal-ammoniac, one ounce; sulfate of copper, one-half dram; strong ammonia, one-half dram.

In mixing my compound I take equal parts of saltpeter or potassium nitrate ($KNO_3$) and sal-ammoniac or ammonium chlorid ($NH_4Cl$) equal parts and thoroughly mix them in a dry state. I then take about two ounces of this mixture to one quart of water, and to the water I add one-half dram each of sulfate of copper and strong liquid ammonia.

In using the above composition I simply apply it to the animal's hoofs at night or at any other suitable time. The composition has the same regenerative effect on the hoof as the ordinary dew on the fields has, it being well known that the dew has this property.

It will be understood that in carrying out my invention certain changes may be made in the proportions of my compound without materially departing from the spirit of my invention.

What I claim as my invention is—

1. The herein-described hoof mixture consisting of water, saltpeter, sal-ammoniac, sulfate of copper and strong ammonia substantially as described and for the purpose specified.

2. The herein-described hoof mixture consisting of water, one quart, saltpeter one ounce or thereabout, sal-ammoniac one ounce or thereabout, strong ammonia one-half dram or thereabout, sulfate of copper one-half dram or thereabout substantially as described and for the purpose specified.

Signed at Winnipeg, in the Province of Manitoba, Canada, this 13th day of June, 1905.

FRANK E. HATCH.

In presence of—
AGNES L. TRELAWNY.
ALEX McMILLAN.